(12) United States Patent
Bhatia et al.

(10) Patent No.: US 10,425,412 B2
(45) Date of Patent: Sep. 24, 2019

(54) DYNAMIC GENERATION OF KEY FOR ENCRYPTING DATA IN MANAGEMENT NODE

(71) Applicant: American Megatrends International, LLC, Norcross, GA (US)

(72) Inventors: Anurag Bhatia, Lilburn, GA (US); Samvinesh Christopher, Suwanee, GA (US); Winston Thangapandian, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 95 days.

(21) Appl. No.: 15/671,555

(22) Filed: Aug. 8, 2017

(65) Prior Publication Data

US 2019/0052634 A1 Feb. 14, 2019

(51) Int. Cl.
| | |
|---|---|
| G06F 21/60 | (2013.01) |
| H04L 9/08 | (2006.01) |
| H04L 29/06 | (2006.01) |
| G06F 21/44 | (2013.01) |
| G09C 1/00 | (2006.01) |
| H04L 9/32 | (2006.01) |

(52) U.S. Cl.
CPC .......... *H04L 63/0876* (2013.01); *G06F 21/44* (2013.01); *G06F 21/602* (2013.01); *G09C 1/00* (2013.01); *H04L 9/08* (2013.01); *H04L 9/0866* (2013.01); *G06F 2221/2107* (2013.01); *H04L 9/3263* (2013.01); *H04L 63/0442* (2013.01)

(58) Field of Classification Search
CPC ..... G06F 21/60; G06F 2221/2107; H04L 9/08
See application file for complete search history.

(56) References Cited

U.S. PATENT DOCUMENTS

| | | | |
|---|---|---|---|
| 2005/0244000 A1* | 11/2005 | Coleman | H04L 9/0662 380/44 |
| 2006/0126836 A1* | 6/2006 | Rivas | H04L 9/0891 380/47 |
| 2013/0163764 A1* | 6/2013 | van den Berg | H04L 9/0822 380/278 |

\* cited by examiner

*Primary Examiner* — Izunna Okeke
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor generates a first encryption key at runtime based on unique device data of the service processor and a first logic. The service processor refrains from storing the first encryption key in the storage device. The service processor further encrypts target data based on the encryption key and an encryption algorithm to obtain first encrypted data. The service processor then stores the first encrypted data in a storage device of the service processor.

11 Claims, 5 Drawing Sheets

DYNAMIC GENERATION OF KEY FOR ENCRYPTING DATA IN MANAGEMENT NODE

BACKGROUND

Field

The present disclosure relates generally to computer systems, and more particularly, to a service processor that can dynamically generating an encryption key for encrypting data without storing the encryption key on the service processor.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

A BMC or a service processor can function as a management node. A management node may save sensitive data (e.g., passwords needed for various services) in an encrypted format in a non-volatile file system of the management node. To generate encrypted data, an employed encryption algorithm needs to use an encryption key. In certain circumstances, the encryption key is also stored in the non-volatile file system of the management node.

Encryption keys stored on a management node can be retrieved by hackers when the management node is hacked. Consequently, a hacker may use the obtained encryption keys to decrypt the encrypted data stored in the management node. Therefore, there is a need for a mechanism that can provide an encryption key to, but without storing the encryption key on, the management node.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor generates a first encryption key at runtime based on unique device data of the service processor and a first logic. The service processor refrains from storing the first encryption key in the storage device. The service processor further encrypts target data based on the encryption key and an encryption algorithm to obtain first encrypted data. The service processor then stores the first encrypted data in a storage device of the service processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
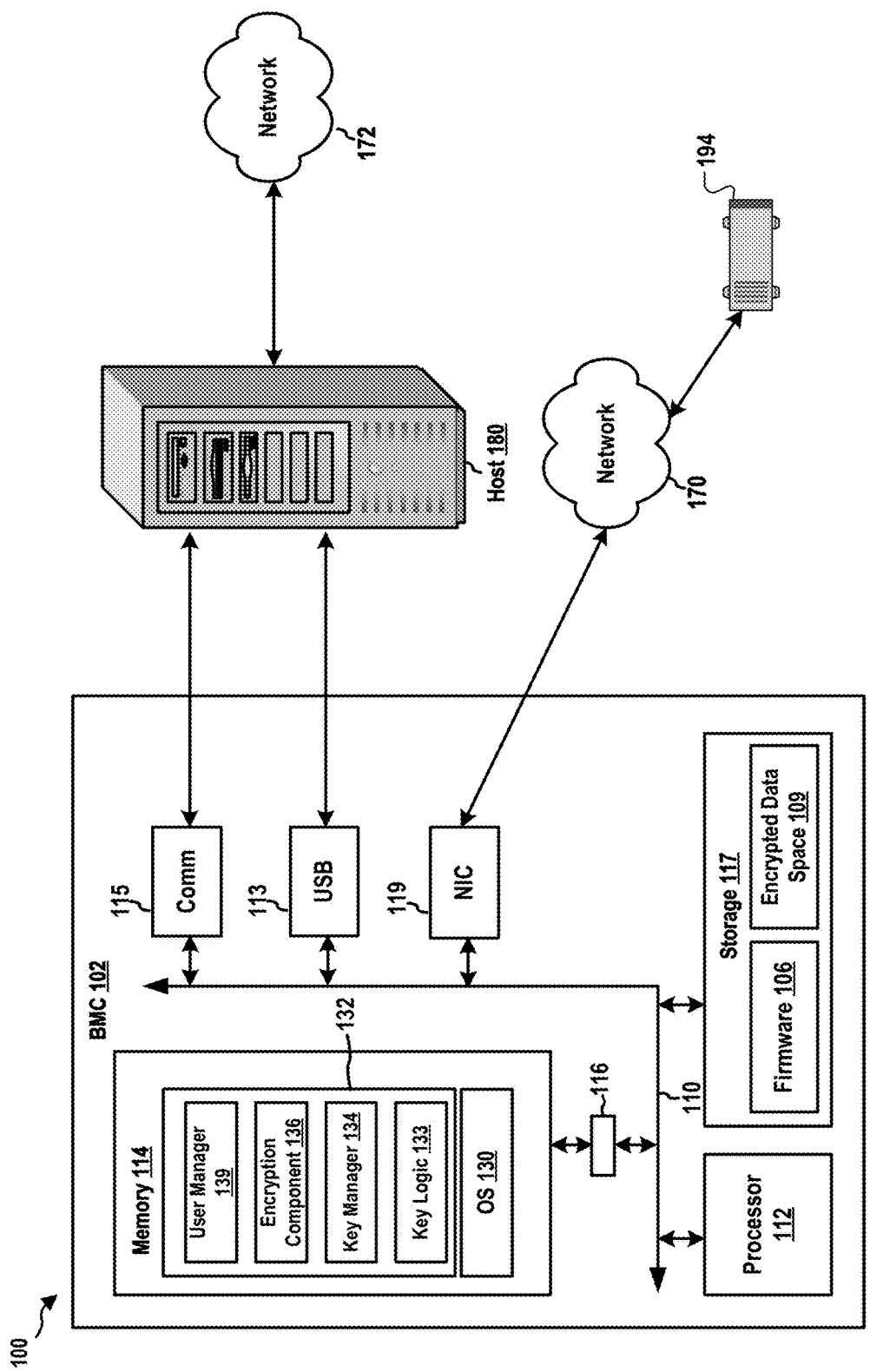
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a BMC 102 and a host computer 180. The BMC 102 has, among other components, a processing unit 112, a memory 114, a memory driver 116, a storage 117, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 includes, among other components, a key logic 133, a key manager 134, an encryption component 136, and a user manager 139. The service components 132 may also include other service management components such as IPMI components. Further, the service components 132 may be implemented as a service stack. As such, the BMC firmware 106 provides an embedded system to the BMC 102.

Further, the storage 117 may also include an encrypted data space 109 (e.g., a folder of a file system) that can be used by the encryption component 136 to store encrypted data as described infra.

The BMC 102 may be in communication with the host computer 180 through the USB interface 113, the network interface card 119, the communication interfaces 115, and/or the IPMI interface. The host computer 180 includes various components including one or more host services. The service stack of the BMC 102 may manage the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and out-of-band to the data network 172. In certain configurations, the communication network 170 may not be connected to the Internet. In certain configurations, the communication network 170 may be in communication with the data network 172 and/or the Internet. In addition, through the communication network 170, a remote device 194 may communicate with the BMC 102. For example, the remote device 194 may send IPMI messages to the BMC 102 over the communication network 170.

The BMC 102 may need to store sensitive data on the BMC 102. For example, the OS 130 and/or the service components 132 may have various user accounts. The password for each user account may be stored on the BMC 102 (e.g., in the storage 117) for authenticating that user account when a user is attempting to log on to the BMC 102 using that user account. The BMC 102 (e.g., the service components 132) may employ the encryption component 136 to encrypt the sensitive data (or other selected data). In this example, the user manager 139 may request the encryption component 136 to encrypt certain data such as user passwords.

The encryption component 136 may use a selected encryption algorithm to encrypt the data seeking protection. The encryption algorithm may be in accordance with Data Encryption Standard (DES) or Advanced Encryption Standard (AES) algorithm, etc. The DES is defined in "Federal Information Processing Standards Publication 46-3, 1999 Oct. 25, SPECIFICATIONS FOR THE DATA ENCRYPTION STANDARD (DES)." The AES is defined in "Federal Information Processing Standards Publication 197, Nov. 26, 2001, Specification for the ADVANCED ENCRYPTION STANDARD (AES)." Both specifications are expressly incorporated by reference herein in their entirety. The encryption component 136 needs to input an encryption key and the data to the encryption algorithm, which accordingly encrypts the data.

The encryption component 136 does not store a copy of the encryption key on the BMC 102 or at any networked location. Rather, the encryption component 136 requests the encryption key from the key manager 134 on runtime when the encryption key is needed to run the encryption algorithm.

The key manager 134 is configured to retrieve or maintain a unique device data of the BMC 102. For example, the processing unit 112 has a unique chip identifier. In other words, identifiers of different processing units or CPUs (e.g., those employed by other BMCs) are different. When the key manager 134 receives a request from the encryption component 136 for the encryption key, the key manager 134 in turn may send a request to the processing unit 112 to obtain the unique chip identifier of the processing unit 112. Upon obtaining the unique chip identifier, the key manager 134 inputs the unique chip identifier to the key logic 133 to generate the encryption key. The key logic 133 is a function that generates the same output for the same input. For example, the key logic 133 may be a cryptographic hash function. The key manager 134 subsequently sends the generated encryption key to the encryption component 136.

Upon receiving the encryption key from the key manager 134, the encryption component 136, as described supra, encrypts the data seeking protection (e.g., user passwords, etc.) using the encryption algorithm with the encryption key. After generating the encrypted data, the encryption component 136 returns the encrypted data to the requesting component of the BMC 102. In this example, the encryption component 136 sends the encrypted data to the user manager 139. The BMC 102 (e.g., the user manager 139) may store the encrypted data in the encrypted data space 109.

Subsequently, a component of the BMC 102 may retrieve the encrypted data from the encrypted data space 109 and request the encryption component 136 to decrypt the encrypted data. In this example, when a user attempts to log on (e.g., remotely from the remote device 194) a service provided by the service components 132, the user manager 139 may use the encrypted password stored in the encrypted data space 109 to verify the password provided by the user.

Upon receiving the encrypted data, the encryption component 136, as described supra, requests the encryption key from the key manager 134. The key manager 134, accordingly, generates the encryption key using the key logic 133 with the unique chip identifier of the processing unit 112. The key manager 134 returns the encryption key to the encryption component 136. The encryption component 136 then inputs the encryption key and the encrypted data to the encryption algorithm to decrypt the encrypted data. The encryption component 136 returns the decrypted data to the component requesting the decrypted data. In this example, the user manager 139 receives the decrypted password.

From time to time, the BMC 102 may receive an updated BMC firmware 106' to replace the current BMC firmware 106. The updated BMC firmware 106' may include an updated key logic 133'. The updated key logic 133' generates, based on the unique chip identifier of the processing unit 112, an encryption key that is different from the encryption key generated by the key logic 133 based on the same unique chip identifier. As such, prior to updating the firmware, an update service of the BMC 102 may request the encryption component 136 to decrypt all encrypted data stored in the encrypted data space 109 and may then store the decrypted data in the encrypted data space 109. Accordingly, the encryption component 136, which is provided by the BMC firmware 106, may request, from the key manager 134, the encryption key generated by the key logic 133. Using the obtained encryption key, the encryption component 136 decrypts the encrypted data. The encryption component 136 returns the decrypted data to the update service of the BMC 102. Upon receiving the decrypted data from the encryption component 136, the update service may store the decrypted data in the encrypted data space 109 (or other selected spaces in the storage 117) temporarily.

Subsequently, the update service replaces the BMC firmware 106 stored in the storage 117 with the updated BMC firmware 106'. After reboot, the BMC 102 executes the updated BMC firmware 106' and loads, among other components, the updated key logic 133'. The BMC 102 then may retrieve the data (which are not encrypted, as described supra) from the encrypted data space 109 (or the other selected spaces). The BMC 102 sends the retrieved data to the encryption component 136 for encryption. Accordingly, the encryption component 136 may request, from the key manager 134, an updated encryption key now generated by the updated key logic 133' provided by the updated BMC firmware 106'. Subsequently, the encryption component 136 inputs the data and the updated encryption key to the encryption algorithm to obtain updated encrypted data. The encryption component 136 then sends the updated encrypted data to the update service of the BMC 102. Upon receiving the updated encrypted data, the update service may store the updated encrypted data in the encrypted data space 109.

Figure 2:
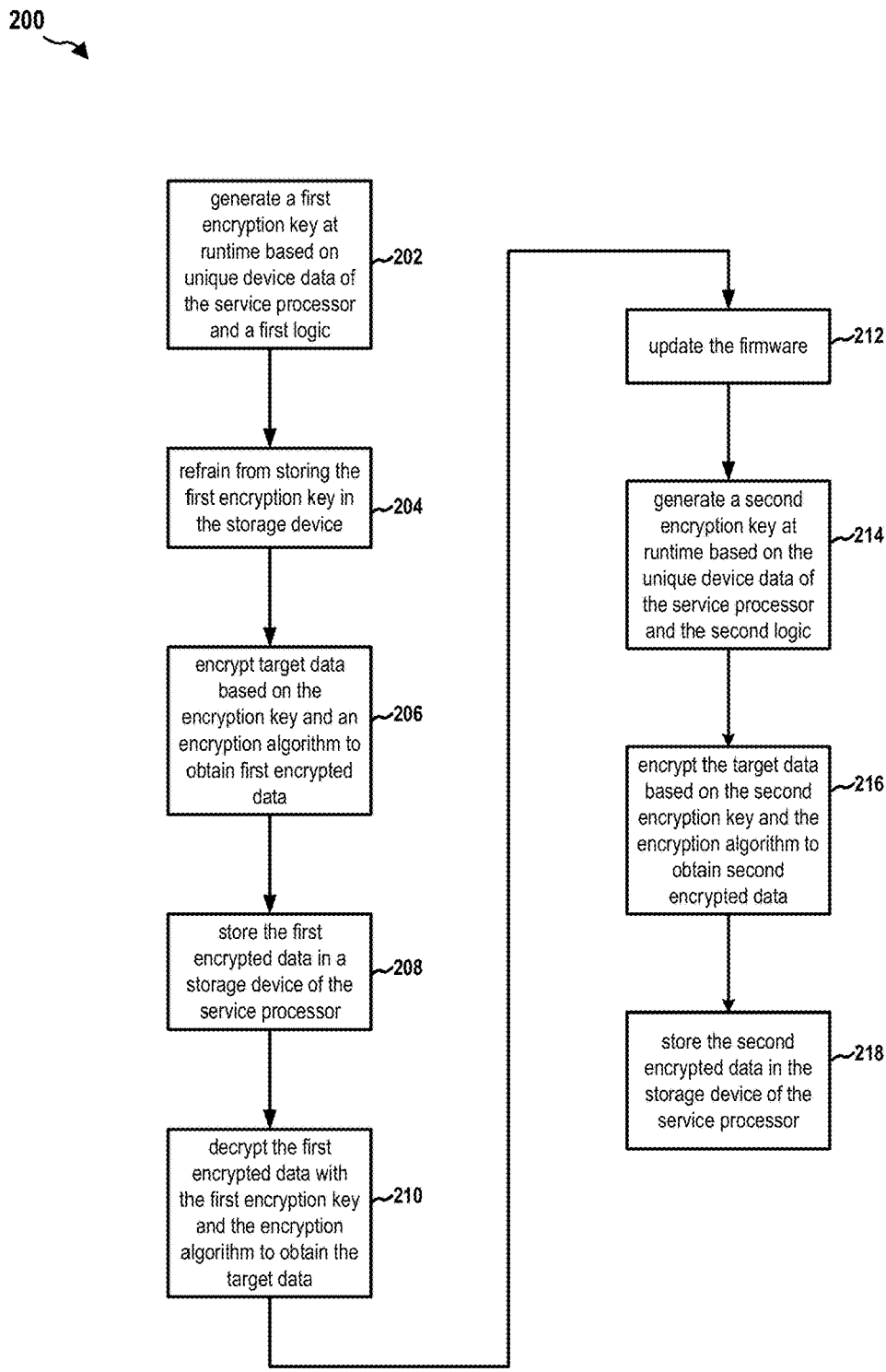
FIG. 2 is a flow chart of a method (process) for encrypting data.

FIG. 2 is a flow chart 200 of a method (process) for encrypting data. The method may be performed by a service processor (e.g., the BMC 102, the apparatus 102'). At operation 202, the service processor generates a first encryption key at runtime based on unique device data of the service processor and a first logic (e.g., the key logic 133). In certain configurations, the unique device data are a unique chip identifier of a processor (e.g., the processing unit 112) of the service processor. In certain configurations, the first logic is provided by firmware (e.g., the BMC firmware 106) of the service processor.

At operation 204, the service processor refrains from storing the first encryption key in a storage device (e.g., the storage 117) of the service processor. At operation 206, the service processor encrypts target data (e.g., user passwords) based on the encryption key and an encryption algorithm to obtain first encrypted data. At operation 208, the service processor stores the first encrypted data in the storage device.

At operation 210, the service processor decrypts the first encrypted data with the first encryption key and the encryption algorithm to obtain the target data, prior to updating the firmware. At operation 212, the service processor updates the firmware. The updated firmware (e.g., the updated BMC firmware 106') includes a second logic (e.g., the updated key logic 133'). At operation 214, the service processor generates a second encryption key at runtime based on the unique device data of the service processor and the second logic. At operation 216, the service processor encrypts the target data based on the second encryption key and the encryption algorithm to obtain second encrypted data. At operation 218, the service processor stores the second encrypted data in the storage device of the service processor.

Figure 3:
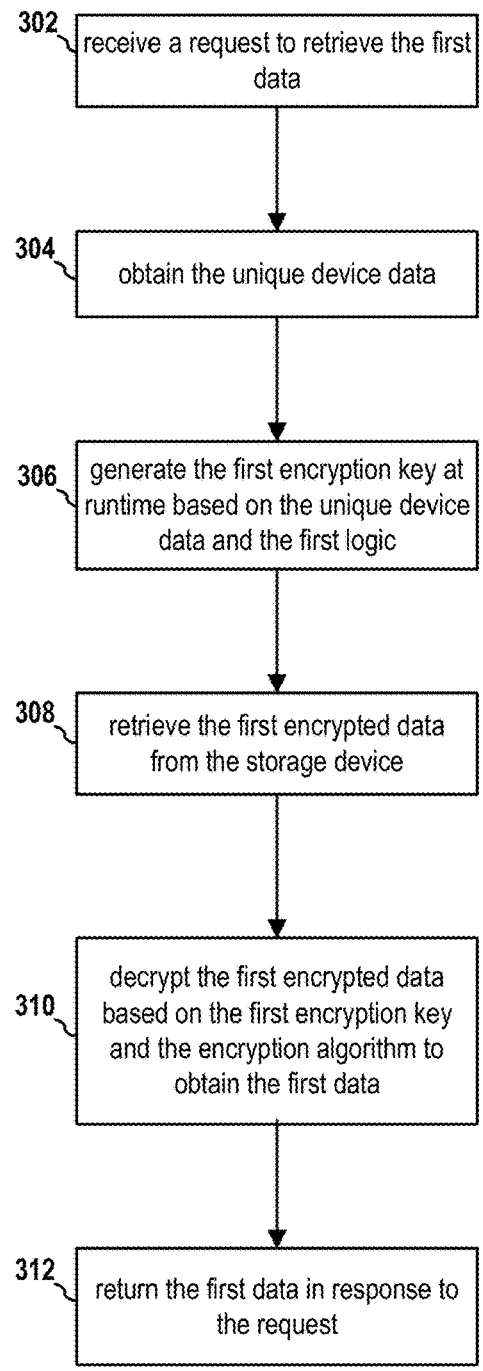
FIG. 3 is a flow chart of a method (process) for decrypting data.

FIG. 3 is a flow chart 300 of a method (process) for decrypting data. The method may be performed by a service processor (e.g., the BMC 102, the apparatus 102'). Subsequent to operation 208 illustrated in FIG. 2, the service processor, at operation 302, receives a request to retrieve the target data stored on the service processor. At operation 304, the service processor obtains the unique device data of the service processor. At operation 306, the service processor generates the first encryption key at runtime based on the unique device data and the first logic. At operation 308, the service processor retrieves the first encrypted data from the storage device. At operation 310, the service processor decrypts the first encrypted data based on the first encryption key and the encryption algorithm to obtain the target data. At operation 312, the service processor returns the target data in response to the request.

Figure 4:
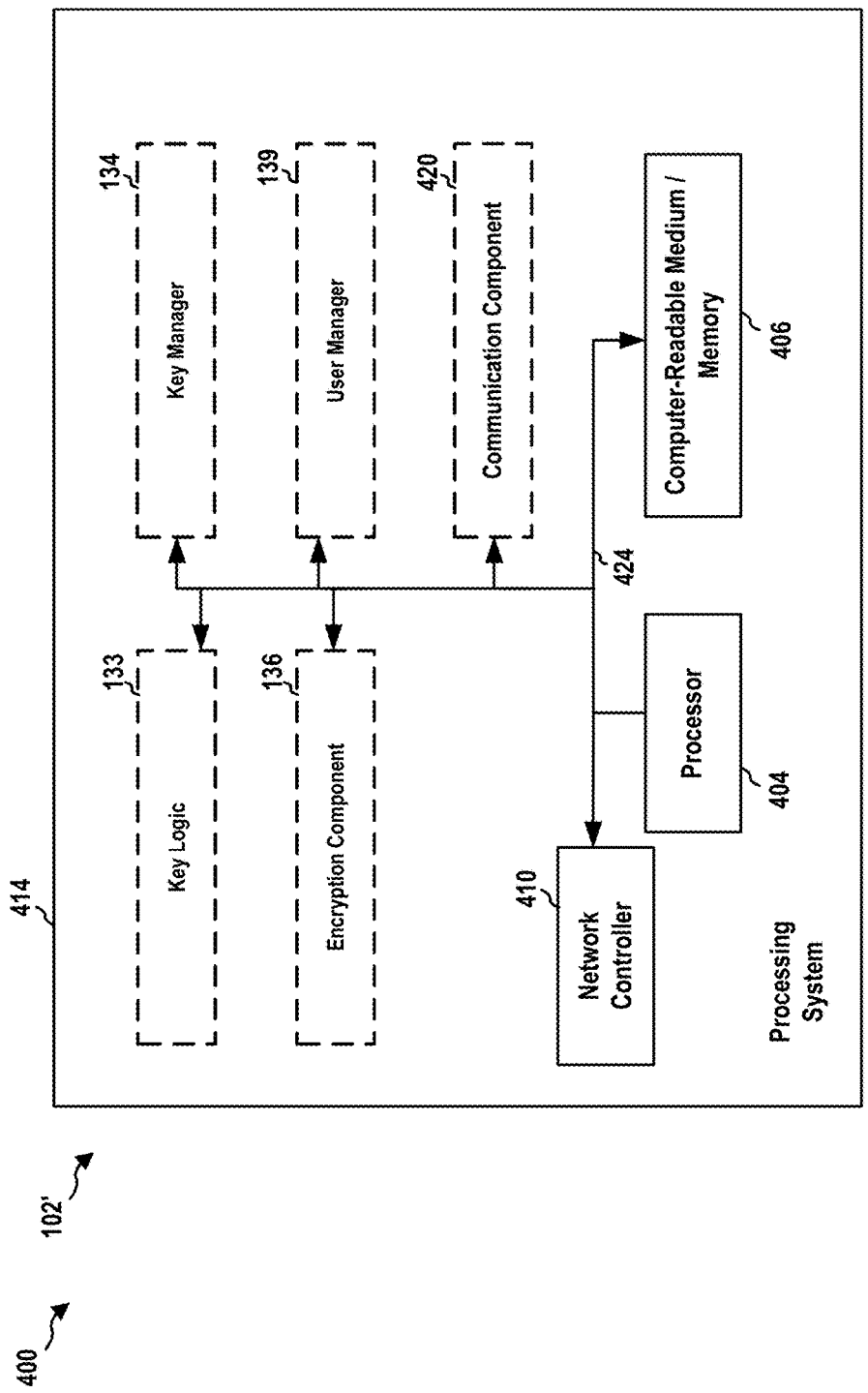
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102. The processing system 414 may be implemented with a bus architecture, represented generally by the bus 424 The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc.

The computer-readable medium/memory 406 may include the memory 114 and/or the storage 117 The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the key logic 133, the key manager 134, the encryption component 136, and the user manager 139. The components may be software components running in the processor 404, resident/stored in the computer readable medium/memory 406, one or more hardware components coupled to the processor 404, or some combination thereof.

The apparatus 102' may be configured to include means for performing operations described supra referring to FIGS. 2-3. The aforementioned means may be one or more of the aforementioned components of the apparatus 102 and/or the processing system 414 of the apparatus 102' configured to perform the functions recited by the aforementioned means.

Figure 5:
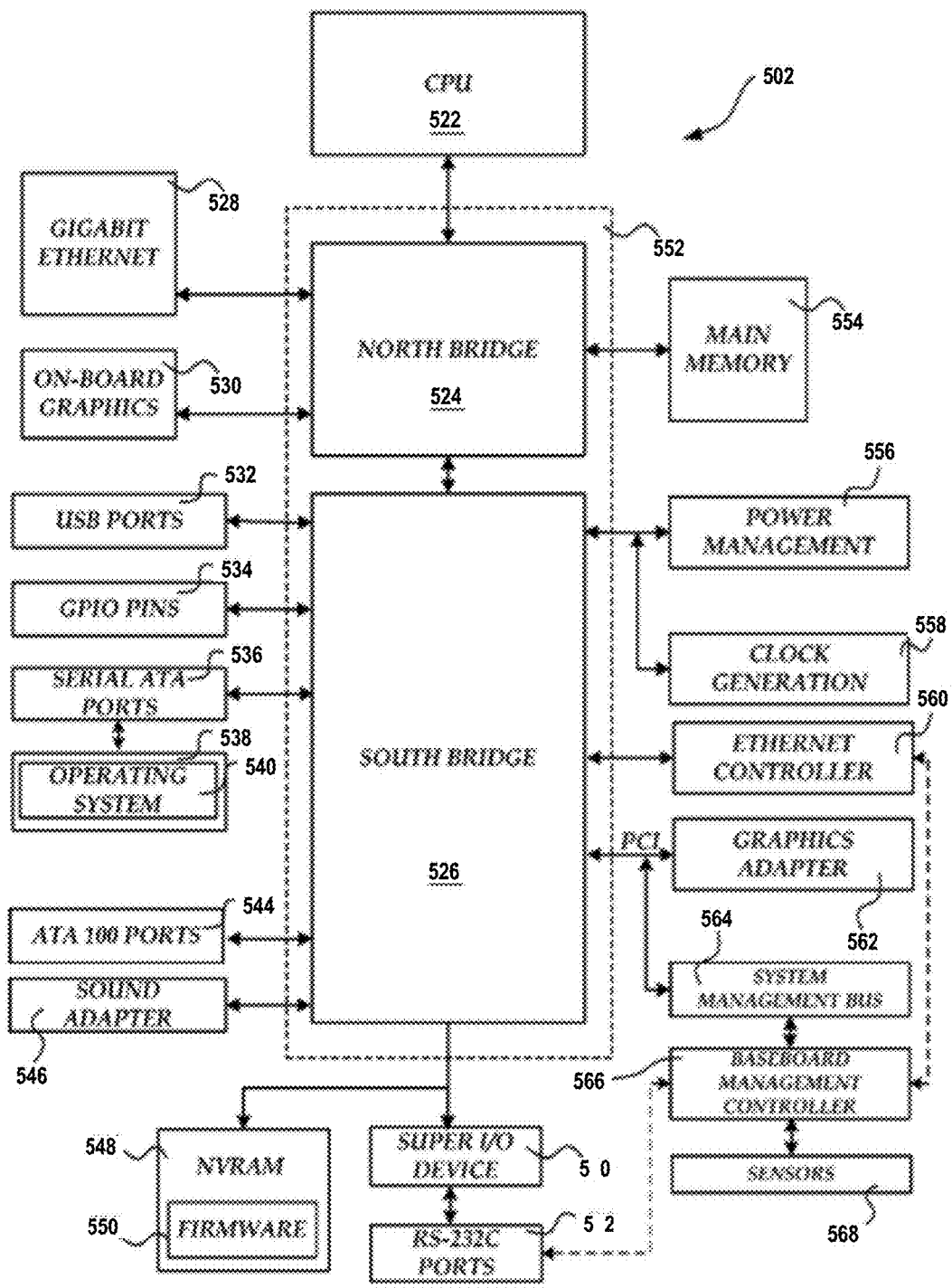
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
generating a first encryption key at runtime based on unique device data of the service processor and a first logic, wherein the first logic is provided by firmware of the service processor;
encrypting target data based on the first encryption key and an encryption algorithm to obtain first encrypted data; and
storing the first encrypted data in a storage device of the service processor;
updating the firmware, the updated firmware including a second logic;
generating a second encryption key at runtime based on the unique device data of the service processor and the second logic;
decrypting the first encrypted data with the first encryption key and the encryption algorithm to obtain the target data prior to updating the firmware;
encrypting the target data based on the second encryption key and the encryption algorithm to obtain second encrypted data subsequent to updating the firmware; and
storing the second encrypted data in the storage device of the service processor.

2. The method of claim 1, wherein the unique device data are a unique chip identifier of a processor of the service processor.

3. The method of claim 1, further comprising: refraining from storing the first encryption key in the storage device.

4. The method of claim 1, further comprising:
receiving a request to retrieve the target data;
obtaining the unique device data;
generating the first encryption key at runtime based on the unique device data and the first logic;
retrieving the first encrypted data from the storage device;
decrypting the first encrypted data based on the first encryption key and the encryption algorithm to obtain the target data; and
returning the target data in response to the request.

5. An apparatus, the apparatus being a service processor, comprising:
a memory; and
at least one processor coupled to the memory and configured to:
generate a first encryption key at runtime based on unique device data of the service processor and a first logic, wherein the first logic is provided by firmware of the service processor;
encrypt target data based on the first encryption key and an encryption algorithm to obtain first encrypted data;
store the first encrypted data in a storage device of the service processor;
update the firmware, the updated firmware including a second logic;
generate a second encryption key at runtime based on the unique device data of the service processor and the second logic;
decrypt the first encrypted data with the first encryption key and the encryption algorithm to obtain the target data prior to updating the firmware;
encrypt the target data based on the second encryption key and the encryption algorithm to obtain second encrypted data subsequent to updating the firmware; and
store the second encrypted data in the storage device of the service processor.

6. The apparatus of claim 5, wherein the unique device data are a unique chip identifier of a processor of the service processor.

7. The apparatus of claim 5, wherein the at least one processor is further configured to refrain from storing the first encryption key in the storage device.

8. The apparatus of claim 5, wherein the at least one processor is further configured to:
receive a request to retrieve the target data;
obtain the unique device data;
generate the first encryption key at runtime based on the unique device data and the first logic;
retrieve the first encrypted data from the storage device;
decrypt the first encrypted data based on the first encryption key and the encryption algorithm to obtain the target data; and
return the target data in response to the request.

9. A non-transitory computer-readable medium storing computer executable code for operating a service processor, comprising code to:
generate a first encryption key at runtime based on unique device data of the service processor and a first logic;
encrypt target data based on the first encryption key and an encryption algorithm to obtain first encrypted data;
store the first encrypted data in a storage device of the service processor;
update the firmware, the updated firmware including a second logic;
generate a second encryption key at runtime based on the unique device data of the service processor and the second logic;
decrypt the first encrypted data with the first encryption key and the encryption algorithm to obtain the target data prior to updating the firmware;
encrypt the target data based on the second encryption key and the encryption algorithm to obtain second encrypted data subsequent to updating the firmware; and
store the second encrypted data in the storage device of the service processor.

10. The non-transitory computer-readable medium of claim 9, wherein the unique device data are a unique chip identifier of a processor of the service processor.

11. The non-transitory computer-readable medium of claim 9, wherein the code is further configured to refrain from storing the first encryption key in the storage device.

* * * * *